Dec. 27, 1932.  P. M. BOURDON  1,892,606
VEHICLE WHEEL
Filed Dec. 28, 1931  2 Sheets-Sheet 1
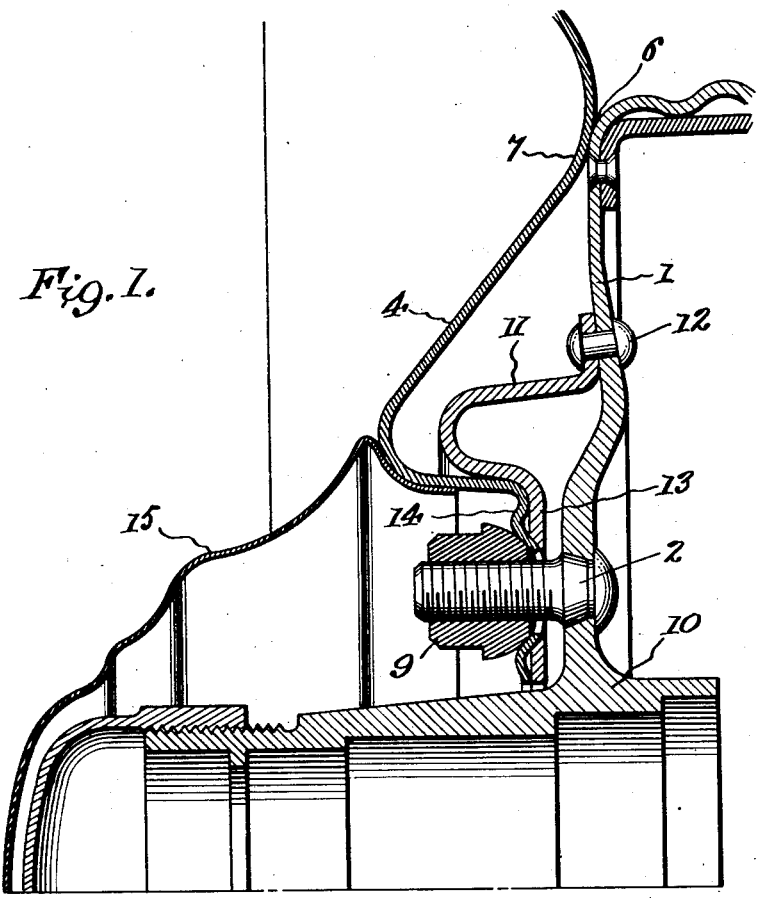
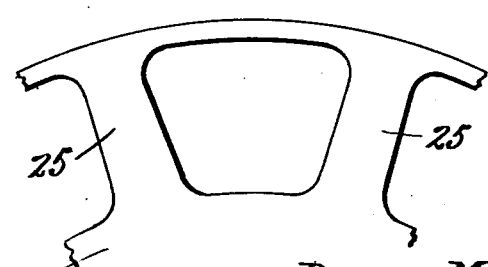
Inventor
Pierre Marcel Bourdon
By Wilkinson & Mawhinney
Attorneys.

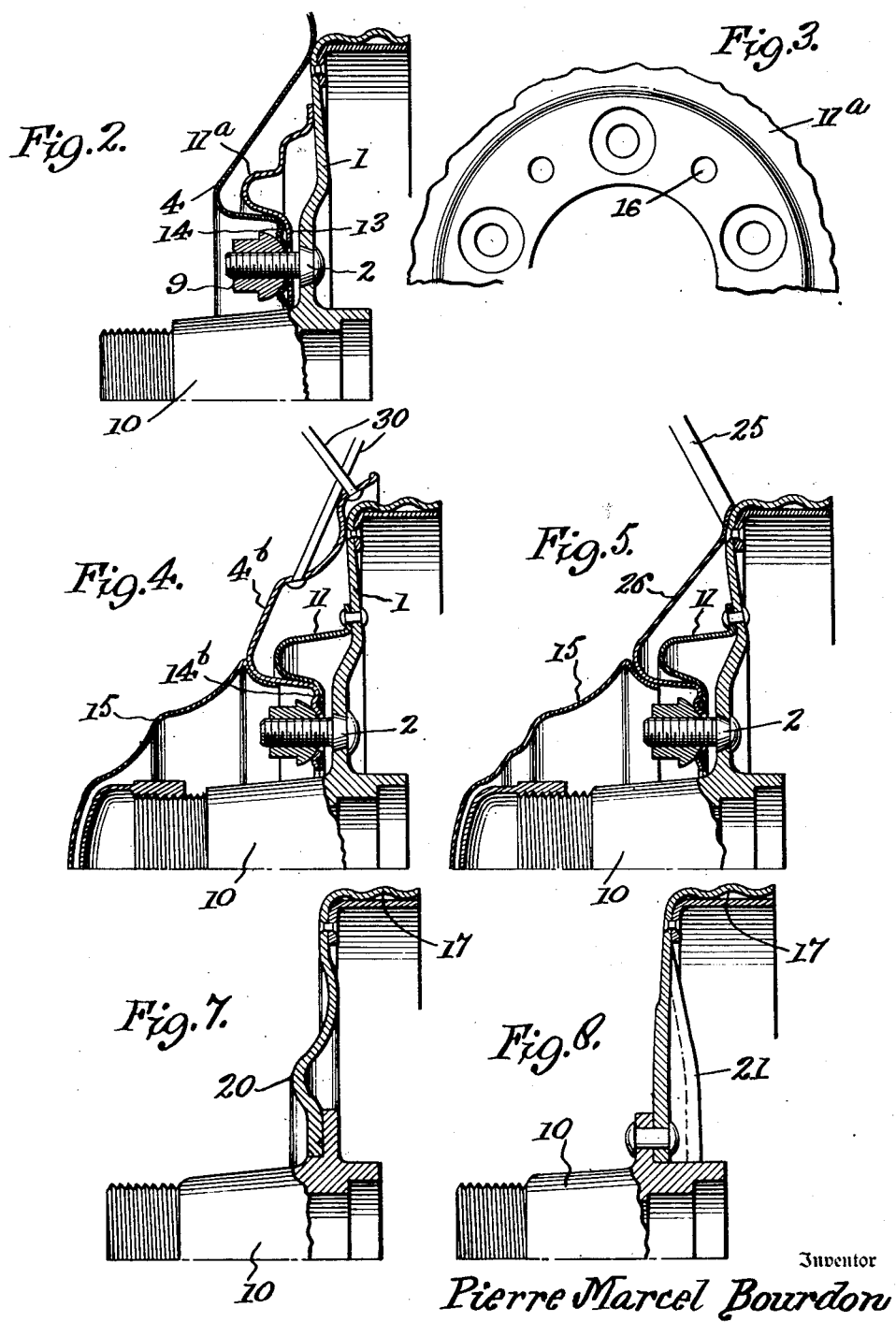

Patented Dec. 27, 1932

1,892,606

UNITED STATES PATENT OFFICE

PIERRE MARCEL BOURDON, OF PARIS, FRANCE, ASSIGNOR TO MICHELIN ET CIE., OF CLERMONT-FERRAND, FRANCE, A CORPORATION OF FRANCE

VEHICLE WHEEL

Application filed December 28, 1931, Serial No. 583,507, and in France January 3, 1931.

The present invention relates to improvements in vehicle wheels, and has for an object to provide certain improvements over the application of Andre Jules Michelin, Ser. No. 501,346, filed December 17, 1930.

In the prior application aforesaid, there is shown and described a wheel in which the disk takes support against the outer portion of the brake drum, or other stationary part of the hub, such disk being subjected to tension by fastening means, which tension results in strain upon the annular contact surface of the disk against the drum or hub part.

The present invention has for its objects:—

(1) An improvement on this type of wheel designed to increase the locking effect of the elastically supported disk of the wheel about the brake drum.

(2) To extend the construction to include the metallic spoked wheels and sheet metal stamped wheels, and (3) To provide an improved brake drum construction capable of withstanding the additional strain to which it is subjected.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a vertical section through an improved disk wheel embodying the invention.

Figure 2 is a similar view showing a modified form of construction.

Figure 3 is a fragmentary face view of one of the members shown in Figure 2.

Figure 4 is a vertical section showing the application of the invention to a metallic spoked wheel.

Figure 5 is a similar view showing the application of the invention to a stamped wheel.

Figure 6 is a fragmentary plan view of the same showing the outer portion of the wheel.

Figure 7 is also a vertical section showing a modified form of the hub and brake drum construction, and Figure 8 is a similar view showing a further modification.

Referring more particularly to the drawings, in Figure 1, 10 designates the hub of a vehicle wheel, and 1 indicates the flange of a brake drum, which flange is made in one piece with the hub 10.

The disk of the wheel is indicated at 4, such disk being secured to the hub by means of an annular series of bolts 2.

The disk 4 bears against the brake drum or flange 1 at the outer annular portion of such flange 1, the annular contacting portion of the disk being indicated at 7; and the annular contacting portion of the brake drum or flange being represented at 6. Both are preferably convex surfaces. The disk 4 is carried outwardly from the annular surface 7 and inwardly, and the same extends in spaced relation about an elastic member 11 which is affixed, as indicated at 12, to the brake drum or to the flange 1.

The member 11 may be made of elastic sheet metal or appropriate material and, while it may have other shapes as illustrated, it consists of an outwardly looped part in order to give it elasticity, from which depends an inner annular plate or ring 13 which is free of all surrounding parts including the hub 10 and its flange 1, so that the plate or ring 13, which is perforated to receive the bolts 2, is elastically supported. The holes in the plate 13, through which the bolts 2 pass, are considerably greater in diameter than the bolts 2.

The disk 4 of the wheel also includes a ring 14 formed by an inwardly looped part of the disk 4 extending below the looped part of the elastic member 11. The ring 14 is disposed against the ring 13 and openings are provided in the ring 14 to align with those in the ring 13 and with the bolts 2. Nuts 9 upon the bolts 2 provide for taking against concave parts of the ring 14 about the bolt openings for drawing the inner part of the disk and the elastic member 11 inwardly toward the hub flange 1.

In this manner, when the nuts 9 are tightened, the elastic rings 13 and 14 will be moved toward the hub flange 1 placing the same under tension and locking the nuts 9 upon the bolts 2 so as to avoid accidental backing of the nuts off. This action will also cause the annular surface 7 of the wheel disk 4 to move up tightly against the annular surface of the brake drum, thus placing the entire disk under tension.

As shown, a cover 15 may be secured over the outer portion of the hub 10 and the bolts 2 and nuts 9, such cover 15 having an inwardly pressed portion adapted to interlock beneath the inwardly looped part of the disk 4.

In Figures 2 and 3 a similar construction is shown, like parts being given the same reference numerals. The only difference consists in the fact that the elastic or resilient member 11a is carried by the disk 4 of the wheel instead of being fastened to the hub flange 1. As shown in Figure 3, the fastening is done by means of rivets 16, riveting the rings 13 and 14 together at points between the holes for the bolts 2. Of course, other securing means may be used.

In Figure 4, the same construction as in Figure 1 is illustrated, like parts being given the same reference characters. The only difference consists in the fact that the wheel is a metallic spoked wheel having the inner annular disk portion 4b to which the spokes 30 are secured at their inner ends. The inner annular disk portion 4b carries a ring 14b which cooperates with the ring 13 as before described.

In Figures 5 and 6, the invention is shown applied to a stamped-out wheel in which 25 illustrates the spokes and 26 the central disk part.

In wheels constructed in the manner indicated, the brake drum or the hub flange bears a part of the lateral strain. Present types of drums and flanges are not made to withstand this strain. Suitable resistance may be embodied in the construction by giving to the hub flange an appropriate form such as shown in Figures 7 and 8.

In Figure 7, an annular rib 20 is shown being concentric with the hub and wheel and with the brake drum.

In Figure 8, radial reinforcing ribs 21 are provided in the hub flange. These two modes of construction shown in Figures 7 and 8 may be combined, if desired.

The exterior drum or crown portion 17 of the brake drum may be constructed to secure great rigidity under the burden of the lateral strain. This rigidity may be secured by means of the ribbed or wave-like construction illustrated.

It will be understood that in the various constructions, the drum including the hub flange may be in one piece with the hub or made separately from it and united to the hub by rivets or other appropriate fastening means.

It will be obvious that various changes in the construction, combination and arrangement of parts could be made, which could be used without departing from the spirit of my invention, and I do not mean to limit the invention to such details, except as particularly pointed out in the claims.

Having thus described my invention, what I claim and desire to secure by Letters Patent of the United States is:—

1. In a vehicle wheel, a hub including a hub flange and a brake drum, a resilient disk having an intermediate annular portion bearing against said brake drum and formed with an inner freely and resiliently supported ring portion with perforations therein, and fastening means comprising bolts carried by the hub for extending through the perforations of said ring portion, and a resilient looped ring having one edge free interposed between said ring portion and the hub flange and apertured to receive said bolts.

2. In a vehicle wheel, a hub including a hub flange and brake drum, a resilient disk having an intermediate annular part bearing against said brake drum and including an inner ring resiliently supported free of the hub, fastening bolts carried by the hub extending freely through said ring, nuts on the bolts for drawing the ring toward the hub flange and placing the disk under tension about said brake drum, and a looped tension member placed between said hub and the inner portion of the disk and including a freely and resiliently supported ring placed opposite the first mentioned ring and acting to force the latter outwardly in opposition to the action of said nuts.

3. In a vehicle wheel, a hub, a brake drum carried thereby, a resilient disk wheel body bearing against the brake drum, fastening means carried by the hub for engaging with the inner portion of the disk to draw the disk tightly against said brake drum, and resilient means acting against the inner portion of said disk tending to move the same away from the brake drum in opposition to the action of said fastening means, said resilient means having one end portion fixed and having a free part engaging the inner portion of the disk.

4. In a vehicle wheel, a hub, a brake drum carried thereby, a resilient disk wheel body bearing against the brake drum, fastening means carried by the hub for engaging with the inner portion of the disk to draw the disk tightly against said brake drum, and an annular resilient member affixed at its outer part to the brake drum and having its inner portion suspended freely of the hub and brake drum by said outer fixed portion, such inner free portion bearing against the inner part of the disk tending to move said inner part of the disk outwardly in opposition to the action of said fastening means.

5. In a vehicle wheel, a hub, a brake drum carried thereby, a resilient disk wheel body bearing against the brake drum, fastening means carried by the hub for engaging with the inner portion of the disk to draw the disk tightly against said brake drum, and resilient means formed of resilient metal having one part thereof secured to the brake drum and a remote part supported freely of the brake drum and hub and bearing yieldably against the inner part of the disk tending to force the same outwardly from the brake drum.

PIERRE MARCEL BOURDON.